US009474990B2

(12) United States Patent
Soderstrom et al.

(10) Patent No.: US 9,474,990 B2
(45) Date of Patent: Oct. 25, 2016

(54) PROCESSES FOR RECOVERING ORGANIC SOLVENT EXTRACTANT FROM SOLID-STABILIZED EMULSIONS FORMED IN HYDROMETALLURGICAL SOLVENT EXTRACTION CIRCUITS

(75) Inventors: Matthew D. Soderstrom, Mesa, AZ (US); Christopher Sexton, Phoenix, AZ (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 13/600,390

(22) Filed: Aug. 31, 2012

(65) Prior Publication Data

US 2013/0228524 A1    Sep. 5, 2013

Related U.S. Application Data

(60) Provisional application No. 61/531,074, filed on Sep. 5, 2011.

(51) Int. Cl.
| | |
|---|---|
| *B01D 21/01* | (2006.01) |
| *C02F 1/52* | (2006.01) |
| *C22B 1/14* | (2006.01) |
| *B01D 17/04* | (2006.01) |
| *C22B 3/20* | (2006.01) |
| *C22B 3/24* | (2006.01) |
| *C02F 1/56* | (2006.01) |
| *C02F 1/68* | (2006.01) |
| *C22B 3/26* | (2006.01) |
| *B01D 11/00* | (2006.01) |
| *C02F 1/00* | (2006.01) |
| *B03D 3/00* | (2006.01) |
| *C22B 1/00* | (2006.01) |
| *C08F 2/32* | (2006.01) |
| *C08F 26/06* | (2006.01) |
| *C02F 1/40* | (2006.01) |
| *C02F 103/16* | (2006.01) |

(52) U.S. Cl.
CPC ............ *B01D 17/04* (2013.01); *B01D 17/047* (2013.01); *C02F 1/5236* (2013.01); *C02F 1/56* (2013.01); *C02F 1/681* (2013.01); *C22B 3/0005* (2013.01); *C22B 3/20* (2013.01); *C22B 3/205* (2013.01); *C22B 3/24* (2013.01); *C02F 1/40* (2013.01); *C02F 2103/16* (2013.01); *C08F 2/32* (2013.01); *C08F 26/06* (2013.01); *Y02P 10/234* (2015.11)

(58) Field of Classification Search
CPC .... B01D 17/02; B01D 17/04; B01D 17/047; C02F 1/52; C02F 1/5236; C02F 1/54; C02F 1/56; C02F 2101/325; C02F 2103/10; C02F 2303/18
See application file for complete search history.

(56) References Cited

U.S. PATENT DOCUMENTS

| | | | |
|---|---|---|---|
| 4,126,551 A | 11/1978 | Cognevich | |
| 4,190,633 A * | 2/1980 | Smith et al. | ............... 423/321.2 |
| 4,207,302 A | 6/1980 | Smith | |
| 4,290,882 A | 9/1981 | Dempsey | |
| 4,759,913 A * | 7/1988 | Headington | .......... C01B 25/235 |
| | | | 210/520 |
| 5,024,821 A | 6/1991 | Greenshields et al. | |
| 5,037,863 A | 8/1991 | Kozakiewicz et al. | |
| 5,037,881 A | 8/1991 | Kozakiewicz et al. | |
| 5,186,817 A * | 2/1993 | Paspek et al. | ................ 208/188 |
| 5,286,806 A | 2/1994 | Neff et al. | |
| 5,334,317 A | 8/1994 | Bannach Sichtermann et al. | |
| 5,405,554 A | 4/1995 | Neff et al. | |
| 5,530,069 A | 6/1996 | Neff et al. | |
| 5,723,548 A | 3/1998 | Kozakiewicz et al. | |
| 5,758,255 A | 5/1998 | Kerr et al. | |
| 5,763,523 A | 6/1998 | Chen et al. | |
| 5,772,730 A | 6/1998 | Bannach Sichtermann et al. | |
| 5,919,882 A | 7/1999 | Ryles et al. | |
| 5,945,494 A | 8/1999 | Neff et al. | |
| 5,997,732 A | 12/1999 | Yenni et al. | |
| 6,130,303 A | 10/2000 | Neff et al. | |
| 6,261,341 B1 | 7/2001 | Cifuentes et al. | |
| 6,419,619 B2 | 7/2002 | Garrido | |
| 6,485,651 B1 * | 11/2002 | Branning | ............ B01F 17/0028 |
| | | | 210/702 |
| 6,500,232 B2 | 12/2002 | Dorlac et al. | |
| 7,338,608 B2 | 3/2008 | Adams et al. | |

(Continued)

FOREIGN PATENT DOCUMENTS

| | | | |
|---|---|---|---|
| CN | 1110329 A | 10/1995 | |
| CN | 102020387 A * | 4/2011 | ................ C02F 1/30 |

(Continued)

OTHER PUBLICATIONS

G. M. Ritcey, "Crud in Solvent Extraction Processing—A Review of Causes and Treatment," Hydrometallurgy; vol. 5; No. 2-3; pp. 97-107; 1980.

(Continued)

*Primary Examiner* — Joseph Drodge
*Assistant Examiner* — Clare Perrin
(74) *Attorney, Agent, or Firm* — Charles E. Bell

(57) ABSTRACT

Processes for recovering an organic solvent extractant phase from a solid-stabilized emulsion formed in a hydrometallurgical solvent extraction circuit are disclosed. One such process includes mixing a de-emulsifier comprising an effective amount of a polymeric aggregating agent with the solid-stabilized emulsion, thereby separating the emulsion into its aqueous, organic, and solid phase components; and removing the organic solvent extractant phase from the other components, thereby recovering the organic solvent extractant phase from the solid-stabilized emulsion.

24 Claims, No Drawings

(56) References Cited

U.S. PATENT DOCUMENTS

| | | | |
|---|---|---|---|
| 7,381,332 B2 * | 6/2008 | Pena et al. | 210/639 |
| 7,572,382 B2 * | 8/2009 | Mesher et al. | 210/708 |
| 7,780,854 B2 * | 8/2010 | Akay et al. | 210/708 |

FOREIGN PATENT DOCUMENTS

| GB | WO 2007082797 A1 * | 7/2007 | B01D 21/01 |
|---|---|---|---|
| WO | 0213939 A1 | 2/2002 | |
| WO | WO 2006032097 A1 * | 3/2006 | C22B 3/30 |
| WO | 2010032212 A1 | 3/2010 | |

OTHER PUBLICATIONS

International Search Report of PCT/US2012/053274 with a mailing date of Oct. 17, 2012.

Written Opinion of PCT/US2012/053274 with a mailing date of Oct. 17, 2012.

E. Jaaskelainen et al., "Adsorption of hydroxyoxime-based extractants on silica and mica particles in copper extraction processes;" Hydrometallurgy 49 (1998) pp. 151-166; Elsevier.

* cited by examiner

PROCESSES FOR RECOVERING ORGANIC SOLVENT EXTRACTANT FROM SOLID-STABILIZED EMULSIONS FORMED IN HYDROMETALLURGICAL SOLVENT EXTRACTION CIRCUITS

CROSS-REFERENCE TO RELATED APPLICATIONS

This application claims benefit of priority to U.S. Provisional Application No. 61/531,074 filed Sep. 5, 2011 the content of which is incorporated herein by reference in its entirety.

BACKGROUND OF THE INVENTION

1. Field of the Invention

The present invention relates to improved processes for enhancing solid/liquid separation of solid-stabilized emulsions formed within hydrometallurgical solvent extraction circuits. More specifically, the present invention relates to the use of water-soluble or water swellable polymeric aggregating agents for recovering organic solvent extractant from solid-stabilized emulsions formed in the hydrometallurgical solvent extraction circuits.

2. Technical Background and Description of the Related Art

Liquid-liquid extraction technology is commonly employed to recover and concentrate metal values from aqueous leach liquors that have been used to dissolve such metal values from their ores. In such a procedure, an aqueous leach liquor containing metal values in ionic form is thoroughly admixed in a mixing device or extraction column with an organic solvent containing an ion exchange or metal complexing agent. In admixture with the metal ion-containing aqueous leach liquor, the organic solvent medium selectively or preferentially dissolves and thereby extracts the metal values from the aqueous leach liquor. After organic solvent extraction of metal values has occurred to the extent desired, the organic/aqueous mixture or dispersion is fed to a settling tank or to the settling region of a mixer-settler wherein the metal-laden organic solvent extract separates by gravity from the metal-depleted aqueous solution. Metal values can be subsequently recovered from the metal-laden organic solvent extract by, for example, conventional electrowinning procedures.

When such an extraction process is conducted in a continuous manner, it is common to have a third phase liquid layer of impurities form between the organic and aqueous phases, i.e., at the organic/aqueous interface in the settling tank or region. Such a third phase impurities layer is colloquially referred to as "gunk" or "crud" in the hydrometallurgical industry. The "crud" layer consists primarily of the organic extraction solvent which contains smaller amounts of aqueous liquid and undissolved particulate material. Such a third phase "crud" layer which forms in the settling tank or region is actually a dispersion, e.g., an emulsion or suspension, of the aqueous and particulate matter in an organic matrix or continuous phase.

During continuous liquid-liquid extraction operations, the third phase layer of impurities often accumulates at the organic/aqueous interface. This "crud" or "solid-stabilized emulsion" may also collect in other regions of the separation device in addition to the oil-water interface. Accumulation is such that in conventional extraction operations, the settling tank itself must be shut down, dumped and flushed out from time to time in order to prevent the accumulating layer of impurities from eventually interfering with the efficiency of the extraction procedure. Crud impedes complete organic solvent-aqueous separation anywhere in the SX process. Shut down of the settling tank or mixer-settler in the extraction process is, of course, economically disadvantageous. Thus, crud formation is a persistent problem common to all solvent extraction operations and is considered one of the primary issues and most common complaints.

Since the crud is at least about 50% organic solvent, it is economically important to recover most if not all of the entrained organic phase. Due to the nature of the problem and the cost of the organic reagent, various systems, processes, and/or equipment for the removal or prevention of crud have been developed as detailed by at least the following patents: U.S. Pat. No. 4,126,551; U.S. Pat. No. 4,190,633; U.S. Pat. No. 4,207,302; U.S. Pat. No. 4,290,882; U.S. Pat. No. 4,759,913; U.S. Pat. No. 5,024,821; U.S. Pat. No. 5,334,317; U.S. Pat. No. 5,334,317; U.S. Pat. No. 5,758,255; U.S. Pat. No. 5,772,730; U.S. Pat. No. 5,997,732; U.S. Pat. No. 6,261,341; U.S. Pat. No. 6,419,619; U.S. Pat. No. 6,500,232; U.S. Pat. No. 7,338,608; U.S. Pat. No. 7,381,332; and U.S. Pat. No. 7,780,854. However, few of these solutions are actually practiced in the field as most suffer from being labor intensive, i.e., involve the physical removal of the crud by an operator, involve long processing times, and/or require costly plant modifications or equipment. The chemical means of preventing crud formation have also not been widely successful. Such means typically involve the use of substantial amounts of chemicals to treat the entire feed stream. The chemicals can then have negative effects on the downstream process (solvent extraction performance), or simply be uneconomic/inefficient.

Accordingly, processes for enhancing solid/liquid separation within hydrometallurgical solvent extraction systems require further improvement. Processes that lead to improved processing of crud by increasing recovery of the organic reagent and/or reducing crud processing time, thereby effectively reducing mining costs for such metals, would be a useful advance in the art and could find rapid acceptance in the metallurgical mining industry.

SUMMARY OF THE INVENTION

The discovery detailed herein provides improved methods for processing crud by increasing recovery of the organic reagent and/or reducing crud processing time, thereby effectively reducing mining costs for metals and maintaining production rates. The improved methods generally include a primary organic separation involving chemically breaking or destabilizing the organic/aqueous emulsion containing fine particulate solids, thereby allowing for a rapid separation of the organic from the aqueous and solids. The improved methods for processing crud may also include (as desired or necessary), a secondary separation step involving further processing the organic sludge layer and/or aqueous/solids following the primary organic separation with standard processing equipment such as centrifuges and/or filter presses, thereby making it possible to achieve increased recoveries of organic reagent and to return it more rapidly and efficiently to the hydrometallurgical process. Accordingly, significant advantages of the processes of the present invention lie in its simplicity to effectuate and operate, and in its low operating costs.

In one aspect, the present invention provides processes for recovering an organic solvent extractant phase from a solid-stabilized emulsion formed in a hydrometallurgical solvent extraction circuit by a) mixing a destabilizing amount of a water-soluble or water-swellable polymeric aggregating agent with the solid-stabilized emulsion, thereby separating the emulsion into its aqueous, organic, and solid components; and b) removing the organic solvent extractant phase from the separated components, thereby recovering the organic solvent extractant phase from the emulsion.

In another aspect, the present invention provides hydrometallurgical solvent extraction compositions that include a solid-stabilized emulsion (e.g., interfacial crud), and a water-soluble or water-swellable polymeric aggregating agent.

In still a further aspect, the invention provides improved processes in hydrometallurgical solvent extraction processes wherein metal values are recovered by: a) contacting a metal bearing substrate with an aqueous mineral acid or ammoniacal solution to produce an aqueous metal-containing leach liquor; b) mixing the aqueous metal-containing leach liquor with an organic solvent containing a metal extractant reagent, whereby at least a fraction of the metal is extracted from the aqueous liquor to the organic solvent, and wherein a third phase emulsion layer of impurities forms at the aqueous/organic interface due to an incomplete separation of the organic and aqueous phases; and c) stripping the metal-containing organic solvent extraction with an aqueous strip solution, the improvement including:
  i) recovering the organic solvent from the solid-stabilized emulsion formed at the aqueous/organic interface by intermixing a water-soluble or water-swellable polymeric aggregating agent with the solid-stabilized emulsion, thereby separating the third phase emulsion layer into its organic, aqueous, and solid components; and
  ii) returning the separated organic solvent phase to the hydrometallurgical solvent extraction process.

These and other objects, features and advantages of this invention will become apparent from the following detailed description of the various aspects of the invention taken in conjunction with the accompanying Examples.

DETAILED DESCRIPTION OF CERTAIN EMBODIMENTS OF THE INVENTION

As summarized above, the present invention relates to the discovery of improved chemical and/or physical processes for enhancing solid/liquid separation of solid-stabilized emulsions formed within hydrometallurgical solvent extraction (SX) circuits. As described more fully below, the inventors have discovered that water-soluble or water-swellable polymeric aggregating agents are surprisingly useful for recovering organic solvent extractant containing metal extraction reagents from solid-stabilized emulsions formed in such SX circuits. Such use leads to reduced crud processing time and improved recovery of the organic extractant phase and the ligand it contains. Ultimately, reduced crud processing time equates to increased SX plant productivity and decreased operational costs.

The crud processing improvement of the present invention can be utilized in various hydrometallurgical processes wherein a third phase or interfacial crud layer forms at the organic/aqueous interface in a liquid-liquid solvent extraction of metal values from aqueous leach liquors. Such an interface typically occurs in the settling tank, though solid-stabilized emulsions can occur or be found throughout the SX circuit. The aqueous leach liquors employed in such processes are conventional leaching solutions known to those ordinarily skilled in the art, and which serve to dissolve metal values from ores, ore concentrates, mine wastes, scrap metals, etc. Such leaching solutions can include, for example, acid or ammoniacal solutions.

Resulting pregnant leach liquors containing dissolved metal values in ionic form are intimately contacted with an organic solvent extractant medium containing a metal extraction reagent in a mixing device or column, whereby metal values are extracted from the leach liquor by the organic solvent extractant containing metal extraction reagent. The organic solvent extractant can be any mobile organic solvent, or mixture of solvents, which is immiscible with water and is inert under the extraction conditions to the other materials present, in combination with any suitable metal extraction reagents, which react with metal ions in the leach liquor to form metal-containing species that are relatively more soluble in the organic solvent extractant phase than in the aqueous leach liquor. Suitable organic solvents for use with the present invention include, for example, hydrocarbon solvents having a low aromatics content (e.g., less than 30%; less than 23%; less than 5%; or less than 1%).

Suitable metal extraction reagents are well known to those of ordinary skill in the art and typically include, for example, one or more orthohydroxyarylaldoxime and/or orthohydroxyarylketoxime. In certain embodiments, 5-($C_8$-$C_{14}$ alkyl)-2-hydroxybenzaldoximes and/or 5-($C_8$-$C_{14}$ alkyl)-2-hydroxyacetophenone oximes may be used as the metal extraction reagent. Preferably, such organic reagents will be those that selectively or preferentially react with one particular species of metal ion so that leach liquors containing several metal species can be treated to separate the desired metal (target metal) therefrom. Those ordinarily skilled in the art will recognize and appreciate which organic reagents to use to selectively or preferentially react with the target metal ion and the prior art is replete with examples of solvent extraction circuits and processes for recovery of various metal values. Accordingly, the metal extraction reagents can also include other additives such as, but not limited to, equilibrium and/or selectivity modifiers, and anti-degradation agents. Such additives have been well treated in the industry and are therefore known to those of ordinary skill in the art.

In the mixing vessel or extraction column, the aqueous leach liquor and organic solvent extractant medium are intimately contacted with each other by, for example, an agitating device, which serves to form a dispersion comprising an aqueous phase, which is rich in dissolved metal values, and an organic extractant phase, which is depleted in dissolved species containing the metal values to be recovered. As a result of the formation of this dispersion, metal-containing species are transferred from the aqueous to the organic phase. After the liquid-liquid extraction operation has been completed in the mixing vessel or extraction column, the resulting aqueous/organic solvent dispersion is transferred to a settling tank or to the settling region of a mixer-settler.

In the settling tank or region, the aqueous/organic solvent dispersion separates by gravity into an organic extractant layer and an aqueous layer. It is during such gravity settling operations that a third phase layer of impurities, or crud, is formed. The third phase is generally between the overlying organic solvent extractant phase and the underlying aqueous phase.

Accordingly, as used herein, the term "crud" refers to the interfacial sludge, which is a solid-stabilized emulsion of aqueous and organic layers. It can range from a thick jelly-like consistency to a solid. "Crud" can also be interchangeably referred to as a "third phase impurity," "dispersion," "solid-stabilized emulsion," or "emulsified suspension," which includes small or minor amounts of aqueous solution and undissolved particulate matter in a major amount of organic extraction solvent. Generally, the "crud" phase comprises from about 80 parts to 96 parts by weight of the organic solvent extractant, from about 2 parts to 20 parts by weight of the aqueous leach liquor, and from about 2 parts to 10 parts by weight of undissolved particulate material present as silicous residue from the ore or other solid material which provides the source of the metal values in the SX process. The particulate fraction of the "crud" also generally contains reaction product of the leach liquor on the host rock, e.g., gypsum, limestone, mica, china clay, jarosite, α-quartz, etc., and can contain decayed biological matter as well. Often "crud" will comprise from about 90 parts to 95 parts by weight organic, about 5 parts to 10 parts by weight aqueous, and about 2 parts to 4 parts by weight particulate.

In one aspect, the invention is an improvement in a hydrometallurgical solvent extraction process wherein metal values are recovered by: a) contacting a metal bearing substrate with an aqueous mineral acid or ammoniacal solution to produce an aqueous metal-containing leach liquor; b) mixing the aqueous metal-containing leach liquor with an organic solvent containing a metal extractant reagent, whereby at least a fraction of the metal is extracted from the aqueous liquor to the organic solvent, and wherein a solid-stabilized emulsion layer of impurities forms at the aqueous/organic interface due to an incomplete separation of the organic and aqueous phases; and c) stripping the metal-containing organic solvent extraction with an aqueous strip solution, the improvement including:

i) recovering the organic solvent from the solid-stabilized emulsion layer formed at the aqueous/organic interface by intermixing a water-soluble or water-swellable polymeric aggregating agent with the solid-stabilized emulsion, thereby separating the emulsion layer into its organic, aqueous, and solid components; and ii) returning the separated organic solvent phase to the hydrometallurgical solvent extraction process.

In accordance with the present invention, a process is provided for recovering an organic solvent extractant phase from a solid-stabilized emulsion formed in a hydrometallurgical solvent extraction circuit by a) mixing a water-soluble or water-swellable polymeric aggregating agent with the solid-stabilized emulsion, thereby separating the emulsion into its aqueous, organic, and solid components; and b) removing the organic solvent extractant phase from the separated components, thereby recovering the organic solvent extractant phase from the emulsion.

Without being bound by theory, it is believed that the polymeric aggregating agent acts as a de-emulsifier or destabilizer to destabilize the particles and break up the emulsion. In certain embodiments, the de-emulsifier comprising the polymeric aggregating agent de-emulsifier can also include a hydrophilic solid. The de-emulsifier can therefore be added in separate parts, such as the water-soluble or water-swellable polymeric aggregating agent alone, or followed by the hydrophilic solid followed by, or vice versa, or simultaneously together.

As used herein, the term "hydrophilic solids" refers to solids including, but not limited to, gravel, sand/silica, dirt, soil, mud, minerals, fragmented rock, clay, silt, ash, cement, zeolites, cellulosics, diatomaceous earth, pumice, oxide minerals, and any combination thereof. Examples of clay suitable for use with the present invention include, but are not limited to, kaolinite, bentonite, montmorillonite, and illite. Those of ordinary skill in the art will recognize and appreciate that clays such as the F-series of acid-activated clays, which include F-1 and F-20X, for example, (available from BASF), are suitable for use with the present invention. Other commercially available clays suitable for use with the present invention include, for example, TONSIL CO® 610 G, 620G, and 630G (available from Sud Chemie). Silica is manufactured in several forms including fused quartz, crystal, fumed silica (or pyrogenic silica, trademarked AEROSIL® or CAB-O-SIL®), colloidal silica, silica gel, and aerogel. Other examples of hydrophilic solids suitable for use with the present invention and commercially available include, but are not limited to, DIATOMITE® and PERLITE®. Other commercially available hydrophilic solids suitable for use with the present invention will be known to those ordinarily skilled in the art.

In certain embodiments, the hydrophilic solid is present at from 0.1% to 10% by weight of the total volume of the solid-stabilized emulsion. In some embodiments, the hydrophilic solid can be present at from 0.3% to 10%; 0.5% to 7%; or 1.0% to 5% by weight of the total volume of the crud. In one embodiment, the hydrophilic solid is present at from 0.5% to 5% by weight of the total volume of the crud.

As summarized above, the crud formed in hydrometallurgical solvent extraction operations is an emulsion of aqueous leach liquor in a continuous organic phase stabilized by finely divided colloidal particles. These particles or particulates impede phase disengagement of the aqueous and organic phases. The water-soluble or water-swellable polymeric aggregating agent portion of the de-emulsifying agent of the invention is a functionalized polymer material that acts on the particulates by simultaneously attaching to the surface of multiple particles to form aggregates and enhance agglomeration of the particles to increase particle size, thereby helping to phase disengage the emulsion. Accordingly, as used herein, the term "polymeric aggregating agent" refers to any cationic, anionic, or nonionic polymeric material derived from at least one water-soluble or water-swellable monomer. Such polymeric aggregating agents may be derived from more than one monomer (e.g., a copolymer or terpolymer). As used herein the term "copolymer" refers to a polymer derived from two or more monomers. A "homopolymer" as used herein refers to a polymer derived from just one monomer. Accordingly, the term "polymer" as used herein refers to either a homopolymer or copolymer. Such water-soluble or water-swellable polymers are generally commercially available in solution (aqueous), dry, or emulsion form, and can range from low to ultra-high molecular weight. Such water-soluble or water-swellable polymeric aggregating agents are well known to those of ordinary skill in the art and have been treated in various patents including, for example, U.S. Pat. No. 5,037,863; U.S. Pat. No. 5,037,881; U.S. Pat. No. 5,286,806; U.S. Pat. No. 5,405,554; U.S. Pat. No. 5,530,069; U.S. Pat. No. 5,723,548; U.S. Pat. No. 5,763,523; U.S. Pat. No. 5,919,882; and U.S. Pat. No. 5,945,494. Many of the water-soluble or water-swellable polymeric aggregating agents treated by the above-referenced patents and suitable for use in accordance with the present invention are also commercially available from Cytec Industries Inc. (Woodlawn Park, N.J.), under various trade names.

In certain embodiments, the polymeric aggregating agent includes a polymer derived from at least one water-soluble or water-swellable monomer chosen from: a) a cationic monomer chosen from one or more of Formulas I, II, or III

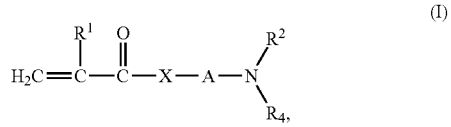

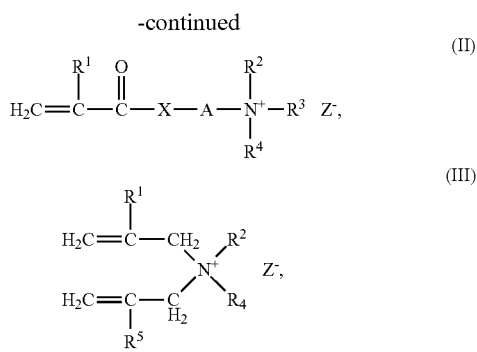

wherein
R¹, R², and R⁵ are each independently hydrogen or a $C_1$ to $C_6$ alkyl;
R³ and R⁴ are each independently hydrogen, a $C_1$ to $C_{12}$ alkyl, aryl, arylalkyl, or hydroxyethyl; and
R² and R⁴ or R² and R³ can combine to form a cyclic ring containing one or more hetero atoms;
Z is the conjugated base of an acid,
X is oxygen or —NR⁶, wherein R⁶ is hydrogen or a $C_1$ to $C_6$ alkyl; and
A is a $C_1$ to $C_{12}$ alkylene;
diallyl dialkylammonium halides (e.g., diallyl dialkylammonium chlorides); N,N-dialkylaminoalkyl(meth)acrylates; N,N-dialkylaminoalkyl(meth)acrylamides; salts thereof; quaternaries thereof; and mixtures thereof;
b) an anionic monomer chosen from: (alkyl)acrylic acid; fumaric acid; crotonic acid; maleic acid; 2-acrylamido-2-(C1-C6 alkyl sulfonic acid); styrene sulfonic acid; salts thereof; and mixtures thereof;
c) a nonionic monomer chosen from: (alkyl)acrylamide; N-(alkyl)acrylamides; N,N-dialkyl acrylamides; methyl acrylate; methyl methacrylate; acrylonitrile; N-vinyl acetamide; N-vinylformamide; N vinyl pyrrolidone; hydroxyalkyl methacrylates; styrene; vinyl acetate; salts thereof; and mixtures thereof.

As used herein, the term "(alkyl)acrylamide" refers to an acrylamide monomer or alkylacrylamide monomers such as methacrylamide, ethylacrylamide, butylacrylamide and the like. Likewise, the term "(alkyl)acrylic acid" refers to acrylic acid, methacrylic acid, ethylacrylic acid and the like. The term "(meth)acrylamide" refers to acrylamide or methacrylamide.

Certain anionic and nonionic polymers suitable for use with the invention include, for example, acrylamide homopolymers or acrylate/acrylamide co-polymers in the form of either an oil-continuous (inverse) emulsion or as a dry powder in DI water with a molecular weight ranging from 1 Million to 50 Million (more typically 10 Million to 30 Million). The polymer solid content is typically in the 25% to 30% range in the emulsion form, and about 90% in the powder form. Typically, the charge for such polymers ranges from <1% to 3%, e.g., <1%, 1%, 1%-2%, or 3%.

In some embodiments, the polymeric aggregating agent is chosen from cationic, anionic, or nonionic polyacrylamides and combinations thereof. Accordingly, in one embodiment, the polymeric aggregating agent can be a homopolymer of (alkyl)acrylamide (e.g., (meth)acrylamide or acrylamide) monomers. In another embodiment, the polymeric aggregating agent can be a copolymer of a cationic (alkyl)acrylamide monomer and an anionic acrylic acid monomer.

In some embodiments, the polymeric aggregating agent can include at least one of the following:

oil-continuous (inverse) emulsion of a high-molecular weight (12-18 Million), very low (3%) charge, acrylate-acrylamide copolymer (25% polymer solids);
oil-continuous (inverse) emulsion of a high molecular weight (10-15 Million), very, very low (<1%) charge, acrylamide homopolymer (25% polymer solids);
oil-continuous (inverse) emulsion of a high-molecular weight (12-18 Million), very low (3%) charge, acrylate-acrylamide copolymer (25%<polymer solids<30%);
oil-continuous (inverse) emulsion of a high-molecular weight (12-18 Million), very low (3%) charge, acrylate-acrylamide copolymer (30%<polymer solids<35%);
dry/powder form of a high-molecular weight (10-15 Million), very low (1%-2%) charge, acrylamide homopolymer (90% polymer solids); or
dry/powder form of a high-molecular weight (10-15 Million), very, very low (<1%) charge, acrylamide homopolymer (90% polymer solids), available from Cytec Industries Inc.

As used herein, the phrase "a destabilizing amount of a polymeric aggregating agent" refers to the amount of aggregating agent necessary to break the organic/aqueous emulsion and allow separation of the organic phase from the aqueous phase and solids. In certain embodiments, the polymeric aggregating agent is present at from 40 to 3500 parts per million (ppm) based on the total volume of the solid-stabilized emulsion. In one embodiment, for example, the polymeric aggregating agent is present at 1000 ppm.

In operation, it is contemplated that the process according to the present invention can either be implemented as an integral part of an SX circuit, or that the crud can be removed from the circuit and treated separately. In either case the recovered organic extractant phase can be returned to the SX circuit for further use in metal extraction. In the process according to the present invention, the mixing step of mixing the de-emulsifier (either as the water-soluble or water-swellable polymeric aggregating agent alone or with a hydrophilic solid) is performed so that a homogenous or substantially homogenous composition ensues. In certain embodiments, the mixing step can be performed from 1 to 10 minutes, and is typically performed from 3 to 5 minutes. Any suitable method can be used to mix the components to achieve the homogenous state including, for example, flow mixers, in-line mixers, or mechanical mixers.

In certain embodiments, a metallurgical-grade diluent is mixed with the solid-stabilized emulsion prior to mixing with the de-emulsifier. Those of skill in the art will recognize and appreciate that the metallurgical-grade diluents should be organic solvents so as to form a continuous mix with the solid-stabilized emulsion, rather than an aqueous diluent which would form a stable gel if mixed with the solid-stabilized emulsion. Any suitable metallurgical-grade organic solvent can be used including, but not limited to, the carrier solvent of the SX circuit ("plant organic"), aromatic paraffins, aliphatic paraffins, naphthalenes, or combinations thereof. Examples of metallurgical-grade organic solvent diluents include any of the ORFOM® SX series of solvent extraction diluents (available from Chevron Phillips Chemical LP, The Woodlands, Tex.); any of the ISOPAR™, NORPAR™, and ESCAID™, 100, 110, and 120 series of solvents (available from ExxonMobil, Houston, Tex.); any of the SSX® series of liquid paraffins (available from Sasol Wax Hayward, Calif.); or any other organic solvents from various petroleum and kerosene fractions.

In certain embodiments, the entrained organic can be rapidly separated from the crud via the chemical methods as described above, thereby effecting a primary organic separation, while the remaining aqueous/solid/organic sludge layer from the primary separation can be further processed in a secondary separation step using ordinary mechanical equipment common to SX plants and processes, such as centrifuges and/or filter presses, thereby providing a second organic solvent phase. After the organic solvent extractant phase is recovered from the first and/or second crud separations, but before it is returned to the SX circuit, it can be further treated by mixing with an effective amount of hydrophilic solid (e.g., clay) in order to remove any surfactants and/or residual solids present in the organic solvent extractant phase to achieve a better quality organic. The hydrophilic solid can then be removed/separated from the organic solvent extractant phase by any suitable method known to those of skill in the art including, but not limited to, decantation or filtering before it is returned to the SX circuit for further use in metal extraction. As with the initial treatment of the hydrophilic solid, the amount of hydrophilic solid added to the recovered organic solvent extractant phase is from 0.1% to 10% by weight of the total volume of the recovered organic solvent extractant phase. In other embodiments, the hydrophilic solid can be present at from 0.3% to 10%; 0.5% to 7%; or 1.0% to 5% by weight of the total volume of the recovered organic solvent extractant phase. In a preferred embodiment, the hydrophilic solid is present at from 0.5% to 5% by weight of the total volume of the recovered organic solvent extractant phase.

The organic solvent extractant phase can then be separated or recovered from the other components of the solid-stabilized emulsion by any mechanical and/or gravitational separation techniques known to those of skill in the art.

The present invention also provides hydrometallurgical solvent extraction compositions comprising a solid-stabilized emulsion (e.g., interfacial crud), and a water-soluble or water-swellable polymeric aggregating agent. The same polymers as discussed above can be used in the compositions. The compositions can also further include a hydrophilic solid. The same hydrophilic solids as discussed above are suitable for use with the compositions of the invention.

EXAMPLES

The following examples are provided to assist one skilled in the art to further understand certain embodiments of the present invention. These examples are intended for illustration purposes and are not to be construed as limiting the scope of the various embodiments of the present invention.

The de-emulsifiers referenced below are available from Cytec Industries Inc. (Woodland Park, N.J.)

Example 1

A sample of crud is taken from the aqueous/organic interface of a commercial copper (Cu) solvent extraction operation. The interfacial crud is allowed to settle, and any free aqueous and organic are decanted from the solid-stabilized emulsion, and then are agitated to achieve a homogeneous emulsion. 150 mL aliquot of the emulsion suspension is added to a 300 mL beaker and is mixed for a set period with a two bladed stainless steel agitator operating at 600 rpm. Following 1 minute of mixing, various de-emulsifiers are admixed to assess the impact on emulsion stability. Following the de-emulsifier addition, the samples are mixed for an additional 3 minutes, the agitator is stopped, and the phases are allowed to separate. Any free organic is decanted and the volume is measured using a graduated cylinder.

TABLE 1

Effect of de-emulsifiers on emulsion stability

| Experiment Number | De-emulsifier | Observation | Recovered Organic (mL) |
|---|---|---|---|
| 1 | None | No change of emulsion | No free organic |
| 2 | 0.5 mL anionic acrylamide/acrylic acid co-polymer emulsion A[1] | No change of emulsion | No free organic |
| 3 | 7.5 g acid-activated bentonite clay | No change of emulsion | No free organic |
| 4 | 7.5 g acid-activated bentonite clay + 0.5 mL anionic acrylamide/acrylic acid co-polymer emulsion A | Free organic immediately noticeable; solids separated quickly from organic after agitation stopped | 95 mL organic |

[1]oil-continuous (inverse) emulsion of a high-molecular weight (12-18 Million), very low (3%) charge, acrylate-acrylamide copolymer (25% polymer solids)

Example 1 illustrates that the combination of both a polymeric aggregating agent and a hydrophilic solid (e.g., acid-activated bentonite clay) are useful in recovering the organic extractant phase from the crud.

Example 2

The test work from Example 1 is repeated with various emulsion-type polymeric aggregating agents.

TABLE 2

Effect of various emulsion-type de-emulsifiers on emulsion stability

| Experiment Number | De-emulsifier | Observation | Recovered Organic (mL) |
|---|---|---|---|
| 1 | 5 g acid-activated bentonite clay + 0.5 mL anionic acrylamide/acrylic acid co-polymer emulsion A | Free organic immediately noticeable; solids separate quickly from organic after agitation stopped | 95 mL organic |
| 2 | 5 g acid-activated bentonite clay + 0.5 mL nonionic acrylamide polymer emulsion A[2] | Free organic immediately noticeable; solids separate quickly from organic after agitation stopped | 93 mL organic |
| 3 | 5 g acid-activated bentonite clay & 0.5 mL anionic acrylamide/acrylic acid co-polymer emulsion B[3] | Free organic immediately noticeable; solids separate quickly from organic after agitation stopped | 93 mL organic |
| 4 | 5 g acid-activated bentonite clay & 0.5 mL anionic acrylamide/acrylic acid co-polymer emulsion C[4] | Free organic immediately noticeable; solids separate quickly from organic after agitation stopped | 93 mL organic |

[2]oil-continuous (inverse) emulsion of a high molecular weight (10-15 Million), very very low (<1%) charge, acrylamide homopolymer (25% polymer solids)
[3]oil-continuous (inverse) emulsion of a high-molecular weight (12-18 Million), very low (3%) charge, acrylate-acrylamide copolymer (25% < polymer solids < 30%)
[4]oil-continuous (inverse) emulsion of a high-molecular weight (12-18 Million), very low (3%) charge, acrylate-acrylamide copolymer (30% < polymer solids < 35%)

Example 2 illustrates that various types of water-soluble or water-swellable polymeric aggregating agents are suitable for use in recovering the organic extractant phase from crud.

Example 3

The same solid-stabilized emulsion (crud) from Examples 1 and 2 is mixed with clay and aqueous-type polymeric aggregating agents using the same procedure as above. Two non-ionic/slightly anionic polymeric aggregating agents are used at varying concentrations.

TABLE 3

Effect of aqueous-type (dry/powder polymer in DI water) polymeric aggregating agents in solution on emulsion stability

| Experiment Number | De-emulsifier | Observation | Recovered Organic (mL) |
|---|---|---|---|
| 1 | 5 g acid-activated bentonite clay + 2.5 mL 0.25% nonionic acrylamide polymer powder A[5] in DI water | Free organic immediately noticeable; solids separate quickly from organic after agitation stopped | 55 mL organic |
| 2 | 5 g acid-activated bentonite clay & 5 mL 0.25% nonionic acrylamide polymer powder A in DI water | Free organic immediately noticeable; solids separate quickly from organic after agitation stopped | 74 mL organic |
| 3 | 5 g acid-activated bentonite clay & 25 mL 0.25% nonionic acrylamide polymer powder A in DI water | Free organic immediately noticeable; solids separate quickly from organic after agitation stopped | 50 mL organic |
| 4 | 5 g acid-activated bentonite clay & 2.5 mL 0.25% nonionic acrylamide polymer powder B[6] in DI water | Free organic immediately noticeable; solids separate quickly from organic after agitation stopped | 65 mL organic |
| 5 | 5 g acid-activated bentonite clay & 5 mL 0.25% nonionic acrylamide polymer powder B in DI water | Free organic immediately noticeable; solids separate quickly from organic after agitation stopped | 70 mL organic |
| 6 | 5 g acid-activated bentonite clay & 25 mL 0.25% nonionic acrylamide polymer powder B in DI water | Free organic immediately noticeable; solids separate quickly from organic after agitation stopped | 52 mL organic |

[5]dry/powder form of a high-molecular weight (10-15 Million), very low (1%-2%) charge, acrylamide homopolymer (90% polymer solids)
[6]dry/powder form of a high-molecular weight (10-15 Million), very, very low (<1%) charge, acrylamide homopolymer (90% polymer solids)

Example 3 shows that the use of aqueous-type polymeric aggregating agents in solution are effective in recovering organic phase from solid-stabilized emulsions, though the amount recovered is significantly less than the organic phase recovered using the emulsion-type polymeric aggregating agents in Example 2. Example 3 also shows a recovery dependence on polymeric aggregating agent concentration and the aqueous volume utilized.

Example 4

Similar experiments to Examples 1-3 are completed; however, the crud is first mixed with a set volume of diluent. 200 mL of metallurgical grade diluent (e.g., ORFOM® SX-12) is added to a 300 mL beaker and mixed with a two bladed stainless steel agitator operating at 600 rpm; a 75 mL aliquot of the solid-stabilized emulsion is added and mixed to homogenization. Following 1 minute of mixing, various de-emulsifiers are added to assess the impact on emulsion stability. Following the de-emulsifier addition, the samples are mixed for an additional 3 minutes, the agitator is stopped, and the phases of the solid-stabilized emulsion are allowed to separate for approximately 5 minutes. Any free organic phase is decanted and the volume measured using a graduated cylinder.

The recovered organic phase is then mixed with a synthetic loading solution (10 gpL Cu at pH 4) to determine the amount of ligand (e.g., oxime) recovered from the organic. The organic phase and the synthetic loading solution are allowed to separate and the organic Cu concentration is measured by atomic absorption. Based on the organic Cu concentration, the oxime concentration is calculated (e.g., gpL Cu/63.54 g Cu per mole Cu)×(2 moles oxime per mole Cu)×(263 g oxime per mole oxime).

TABLE 4

Effect of pre-dilution of the solid-stabilized emulsion with organic continuous diluents on emulsion stability and ligand recovery

| Test Number | De-emulsifier | Observation | Recovered Organic (mL) |
|---|---|---|---|
| 1 | None | Free organic noticeable; solids separated slowly from organic after agitation stopped | 192 mL organic; 5.8 gpL oxime |
| 2 | 0.8 mL anionic acrylamide/ acrylic acid co-polymer emulsion A | Free organic immediately noticeable; solids separated quickly from organic after agitation stopped | 226 mL organic; oxime not measured |
| 3 | 7.5 g acid-activated bentonite clay + 0.8 mL anionic acrylamide/ acrylic acid co-polymer emulsion A | Free organic immediately noticeable; solids separated quickly from organic after agitation stopped | 240 mL organic; 7.9 gpL oxime |

In test 1 the diluent is absorbed into the crud, resulting in an organic volume loss; however, the diluent that is recovered contains 5.8 gpL oxime. In tests 2 and 3, the use of an emulsion-type polymeric aggregating agent alone (test 2) or in combination with a hydrophilic solid (test 3) results in an increase in the total organic volume recovered as well as an increase in oxime content.

Example 5

Additional experiments are completed as described in Example 4; however, the diluent added to the solid-stabilized emulsion is water. 200 mL of DI water is added to a 300 mL beaker and mixed with a two bladed stainless steel agitator operating at 600 rpm; then 75 mL aliquot of the solid-stabilized emulsion is added and mixed until homogenized. Following 1 minute of mixing, various de-emulsifiers are added to assess the impact on emulsion stability. Following the addition of de-emulsifiers, the samples are mixed for an additional 3 minutes, the agitator is stopped, and the phases are allowed to separate. Any free organic phase is decanted and the volume is measured using a graduated cylinder.

TABLE 5

Effect of pre-dilution of the solid-stabilized emulsion with aqueous continuous diluents on emulsion stability

| Test Number | De-emulsifier | Observation | Recovered Organic (mL) |
|---|---|---|---|
| 1 | None | Emulsion (top layer) separates slowly from water; water (bottom layer) turns brown | No free organic |
| 2 | 0.2 mL anionic acrylamide/acrylic acid co-polymer emulsion A | Emulsion (top layer) separates quickly from water; emulsion becomes gel-like; water (bottom layer) turns cloudy white | No free organic |
| 3 | 2.5 g acid-activated bentonite clay + 0.2 mL anionic acrylamide/acrylic acid co-polymer emulsion A | Emulsion (top layer) separates quickly from water; emulsion becomes gel-like; water (bottom layer) turns cloudy white | No free organic |

Example 5 shows the importance of utilizing an organic continuous mix as a diluent. The combination of polymeric aggregating agent and aqueous continuous mixture results in the formation of a stable gel.

Example 6

Crud samples are taken from the aqueous/organic interface of a different commercial Cu solvent extraction operation than those used in Examples 1-5. The interfacial crud is allowed to settle, and any free aqueous and/or organic is decanted from the solid-stabilized emulsion, and then agitated to achieve a homogeneous mixture. 500 mL (510 g) of the emulsion suspension is filtered through a press filter at 100 psi and found to contain 14.1 wt % solids, 39.2 vol % organic phase, and 32.2 vol % aqueous, relative to the initial 500 mL of crud added to the filter press. 100 mL of metallurgical grade diluent (ORFOM® SX-12) is added to a 300 mL beaker and mixed with a two bladed stainless steel agitator operating at 600 rpm; a 100 mL (102 g) aliquot of the solid-stabilized emulsion, containing ~14.5 g solids, is added and mixed for a set period. Following 1 minute of mixing, various de-emulsifiers are added to assess the impact on emulsion stability. Following the addition of de-emulsifiers, the samples are mixed for an additional 3 minutes, the agitator is stopped, and the phases are allowed to separate for approximately 5 minutes. Any free organic is decanted and the volume is measured using a graduated cylinder.

TABLE 6

Effect of various de-emulsifier dosages on emulsion stability

| Test Number | De-emulsifier | Recovered Organic (mL) | Dosage of De-emulsifier, relative to solids in crud |
|---|---|---|---|
| 1 | None | 108 mL organic | NA |
| 2 | 0.3 mL anionic acrylamide/acrylic acid co-polymer emulsion A | 122 mL organic | 0.021 mL anionic acrylamide/acrylic acid co-polymer emulsion A/g solids |
| 3 | 0.25 g acid-activated bentonite clay + 0.3 mL anionic acrylamide/acrylic acid co-polymer emulsion A | 125 mL organic | 0.017 g clay/g solids 0.021 mL anionic acrylamide/acrylic acid co-polymer emulsion A/g solids |
| 4 | 0.5 g acid-activated bentonite clay + 0.3 mL anionic acrylamide/acrylic acid co-polymer emulsion A | 126.5 mL organic | 0.034 g clay/g solids 0.021 mL anionic acrylamide/acrylic acid co-polymer emulsion A/g solids |
| 5 | 1 g acid-activated bentonite clay + 0.3 mL anionic acrylamide/acrylic acid co-polymer emulsion A | 127 mL organic | 0.069 g clay/g solids 0.021 mL anionic acrylamide/acrylic acid co-polymer emulsion A/g solids |
| 6 | 2 g acid-activated bentonite clay + 0.3 mL anionic acrylamide/acrylic acid co-polymer emulsion A | 122 mL organic | 0.138 g clay/g solids 0.021 mL anionic acrylamide/acrylic acid co-polymer emulsion A/g solids |
| 7 | 3 g acid-activated bentonite clay + 0.3 mL anionic acrylamide/acrylic acid co-polymer emulsion A | 118 mL organic | 0.207 g clay/g solids 0.021 mL anionic acrylamide/acrylic acid co-polymer emulsion A/g solids |
| 8 | 7 g acid-activated bentonite clay + 0.3 mL anionic acrylamide/acrylic acid co-polymer emulsion A | 122 mL organic | 0.483 g clay/g solids 0.021 mL anionic acrylamide/acrylic acid co-polymer emulsion A/g solids |
| 9 | 1 g acid-activated bentonite clay + 0.1 mL anionic acrylamide/acrylic acid co-polymer emulsion A | 108 mL organic | 0.069 g clay/g solids 0.007 mL anionic acrylamide/acrylic acid co-polymer emulsion A/g solids |
| 10 | 1 g acid-activated bentonite clay + 0.3 mL anionic acrylamide/acrylic acid co-polymer emulsion A | 127 mL organic | 0.069 g clay/g solids 0.02 mL anionic acrylamide/acrylic acid co-polymer emulsion A/g solids |
| 11 | 1 g acid-activated bentonite clay + 0.5 mL anionic acrylamide/acrylic acid co-polymer emulsion A | 126 mL organic | 0.069 g clay/g solids 0.034 mL anionic acrylamide/acrylic acid co-polymer emulsion A/g solids |
| 12 | 1 g acid-activated bentonite clay + 1.5 mL anionic acrylamide/acrylic acid co-polymer emulsion A | 128 mL organic | 0.069 g clay/g solids 0.103 mL anionic acrylamide/acrylic acid co-polymer emulsion A/g solids |
| 13 | 1.5 g acid-activated bentonite clay + 0.45 mL anionic acrylamide/acrylic acid co-polymer emulsion A | 123 mL organic | 0.103 g clay/g solids 0.031 mL anionic acrylamide/acrylic acid co-polymer emulsion A/g solids |

Tests 1-8 show that ~0.069 g of acid activated bentonite clay as hydrophilic solid per gram of crud solids is an appropriate dosage of hydrophilic solid in order to achieve high recovery of organic phase from crud with a fixed amount of polymeric aggregating agent. Tests 9-13 show that ~0.021 mL of anionic acrylamide/acrylic acid co-polymer emulsion A as polymeric aggregating agent per gram of crud solids is an appropriate dosage in order to achieve high recovery of organic phase from crud with a fixed amount of hydrophilic solid. Higher dosages of polymeric aggregating agent and hydrophilic solid (e.g., Test 5) show little to no improvement. Test 12 shows that a high amount of polymeric aggregating agent gains a slightly improved organic phase recovery. An appropriate ratio of polymeric aggregating agent to clay addition is 0.021 mL polymeric aggregating agent/0.069 g clay=30%.

Example 7

Similar experiments to those in Example 6 are performed again except with crud from a different commercial copper SX operation. The interfacial crud is allowed to settle, any free aqueous and/or organic phase is decanted from the solid-stabilized emulsion, and then agitated to achieve a homogeneous mixture. 1 L (977.8 g) of the solid-stabilized emulsion is filtered through a press filter at 100 psi and is found to contain 17.2 wt % solids, 35.0 vol % organic phase, and 22.0 vol % aqueous phase, relative to the initial 500 mL of crud added to the filter press. 200 mL of metallurgical grade diluent (ORFOM® SX-12) is added to a 600 mL beaker and is mixed with a two bladed stainless steel agitator operating at 80 rpm; a 200 mL (216 g) aliquot of the solid-stabilized emulsion is added and is mixed until homogenized. Following 1 minute of mixing, various de-emulsifiers are added to assess the impact on emulsion stability. Following the addition of de-emulsifiers, the samples are mixed for an additional 3 minutes, the agitator is stopped, and the phases are allowed to separate for approximately 5 minutes. Any free organic phase is decanted and the volume is measured using a graduated cylinder.

TABLE 7

Effect of various de-emulsifier dosages on emulsion stability

| Test Number | De-emulsifier | Recovered Organic (mL) | Dosage of De-emulsifier, relative to solids in crud |
|---|---|---|---|
| 1 | None | 140 mL organic | NA |
| 2 | 1.49 g acid-activated bentonite clay + 0.448 mL anionic acrylamide/acrylic acid co-polymer emulsion B | 222 mL organic | 0.044 g clay/g solids 0.013 mL anionic acrylamide/acrylic acid co-polymer emulsion B/g solids |
| 3 | 1.87 g acid-activated bentonite clay + 0.560 mL anionic acrylamide/acrylic acid co-polymer emulsion B | 250 mL organic | 0.056 g clay/g solids 0.017 mL anionic acrylamide/acrylic acid co-polymer emulsion B/g solids |
| 4 | 2.98 g acid-activated bentonite clay + 0.896 mL anionic acrylamide/acrylic acid co-polymer emulsion B | 252 mL organic | 0.089 g clay/g solids 0.027 mL anionic acrylamide/acrylic acid co-polymer emulsion B/g solids |
| 5 | 3.73 g acid-activated bentonite clay + 1.12 mL anionic acrylamide/acrylic acid co-polymer emulsion B | 252 mL organic | 0.111 g clay/g solids 0.033 mL anionic acrylamide/acrylic acid co-polymer emulsion B/g solids |

Example 7 shows that ~0.056 g of acid-activated bentonite clay as hydrophilic solid per gram of crud solids and ~0.017 mL of anionic acrylamide/acrylic acid co-polymer emulsion B as polymeric aggregating agent per gram of crud solids is an appropriate dosage of hydrophilic solid and polymeric aggregating agent in order to achieve high recovery of organic phase from crud. Again, higher dosages of polymeric aggregating agent and hydrophilic solid (e.g., Tests 4 and 5) show little improvement on organic phase recovery.

Example 8

Samples of crud (A-E) are taken from the aqueous/organic interface of various commercial Cu solvent extraction operations. The interfacial crud of each sample is allowed to settle, any free aqueous and/or organic phase is decanted from the solid-stabilized emulsions, and then is agitated to achieve a homogeneous mixture. A specified volume of the solid-stabilized emulsion from each sample is added to a filter press and is filtered through a single layer of 8-12 μm particle retention filter paper at 100 psi. The resulting organic and aqueous phases from filtration are collected below the filter press and the filter press is turned off after no further separation of the crud is observed. The resulting solids, organic, and aqueous phases from each sample are collected and measured.

The same samples of crud (A-E) are also processed using the chemical separation techniques according to the present invention (similar to those described in Examples 1-7), by mixing a volume of crud in an organic continuous mixture of metallurgical grade diluent (e.g., ORFOM® SX-12), adding a de-emulsifier, mixing until homogenized (for about 3 minutes), and allowing the phases to separate for 5 minutes. Any free organic phase is decanted and the volume measured using a graduated cylinder. The organic phase recovered from chemical separation is recorded as a percent of the organic that could be achieved relative to using mechanical separation (filter press).

TABLE 8

Effect of mechanical separation versus chemical separation of solid-stabilized emulsions

| | | Separated using Mechanical Separation (Filter Press) | | | | | % Organic | Rate of Organic |
|---|---|---|---|---|---|---|---|---|
| Crud Sample | Crud Type | Initial Crud Amount | Wt % Solids in Crud | Vol % Aqueous in Crud | Vol % Organic in Crud | Rate of Organic Recovery from Filtration | Recovered from chemical separation | Recovery from Chemical Separation |
| A | Extract | 171 g/200 mL | 1.8% | 6% | 83% | — | 84.3% | — |
| B | Extract | 236 g/267 mL | 3.9% | 6.7% | 70% | — | 97.1% | — |
| C | Extract | 454 g/500 mL | 5.5% | 12% | 51% | — | 90.2% | — |

TABLE 8-continued

Effect of mechanical separation versus chemical separation of solid-stabilized emulsions

| Crud Sample | Crud Type | Initial Crud Amount | Separated using Mechanical Separation (Filter Press) | | | | % Organic Recovered from chemical separation | Rate of Organic Recovery from Chemical Separation |
|---|---|---|---|---|---|---|---|---|
| | | | Wt % Solids in Crud | Vol % Aqueous in Crud | Vol % Organic in Crud | Rate of Organic Recovery from Filtration | | |
| D | Extract | 438 g/500 mL | 1.3% | 12% | 72% | 3.3 mL/min (500 mL crud treated) | 87.9% | 15.8 mL/min (200 mL crud treated) |
| E | Strip | 1012 g/1 L | 32.7% | 22% | 35% | 1.1 mL/min (1 L crud treated) | 89% | 27.5 mL/min (700 mL crud treated) |

The percent of solids, aqueous, and organic phases recovered from mechanical crud separation are based on the initial amount of crud added to the filter press. Some of the initial crud is lost during filtration and is unaccounted for. The percentage of organic phase recovered from chemical separation is relative to the percent of organic phase that could be achieved using mechanical separation.

Higher organic phase recovery is achieved using mechanical separation versus chemical separation to break the solid-stabilized emulsion. The rate of organic phase recovery is calculated by the amount of organic phase recovered divided by the time required for separation. Mechanical separation is very time consuming, requiring between 1 and 8 hours for separation to be completed. Chemical separation according to processes of the present invention is much faster, requiring less than 3 minutes for mixing time and less than 5 minutes for settling time.

As employed above and throughout the disclosure, various terms are provided to assist the reader. Unless otherwise defined, all terms of art, notations and other scientific terminology used herein are intended to have the meanings commonly understood by those of skill in the chemical and/or hydrometallurgical arts. As used herein and in the appended claims, the singular forms include plural referents unless the context clearly dictates otherwise. All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. Various patent and/or scientific literature references have been referred to throughout this application. The disclosures of these publications in their entireties are hereby incorporated by reference as if written herein. In the case of conflicting terms, the terms of this document will prevail. In view of the above description and the examples, one of ordinary skill in the art will be able to practice the invention as claimed without undue experimentation.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

The invention claimed is:

1. A process for recovering an organic solvent extractant phase from a solid-stabilized emulsion formed in a hydrometallurgical solvent extraction circuit comprising:
  a) mixing a destabilizing amount of a polymeric aggregating agent in the form of an oil-continuous polymeric emulsion with the solid-stabilized emulsion prior to, after, or simultaneously with adding at least one hydrophilic solid to said solid-stabilized emulsion, thereby separating the solid-stabilized emulsion into its aqueous, organic, and solid components; and
  b) removing the organic solvent extractant phase from the separated components, thereby recovering the organic solvent extractant phase from the solid-stabilized emulsion, wherein the polymeric aggregating agent comprises at least one water-soluble or water-swellable polymer derived from at least one monomer selected from the group consisting of:
  i) a cationic monomer chosen from one or more of Formulas I, II, or III

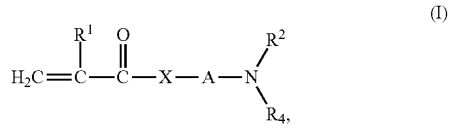

(I)

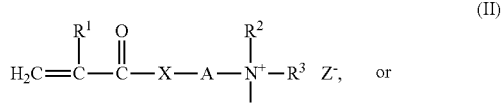

(II)

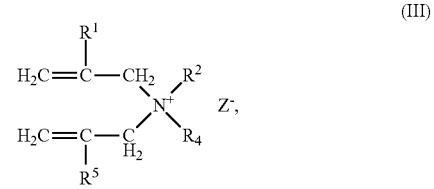

(III)

wherein
  $R^1$, $R^2$, and $R^5$ are each independently hydrogen or a $C_1$ to $C_6$ alkyl;
  $R^3$ and $R^4$ are each independently hydrogen, a $C_1$ to $C_{12}$ alkyl, aryl, arylalkyl, or hydroxyethyl; and
  $R^2$ and $R^4$ or $R^2$ and $R^3$ can combine to form a cyclic ring containing one or more hetero atoms;

Z is the conjugated base of an acid,

X is oxygen or —NR$^6$, wherein R$^6$ is hydrogen or a C$_1$ to C$_6$ alkyl; and A is a C$_1$ to C$_{12}$ alkylene;

diallyl dialkylammonium halides; N,N-dialkylaminoalkyl (meth)acrylates; N,N-dialkylaminoalkyl(meth)acrylamides; salts thereof; quaternaries thereof; and mixtures thereof;

ii) an anionic monomer selected from the group consisting of (alkyl)acrylic acid; fumaric acid; crotonic acid; maleic acid; 2-acrylamido-2-(C$_1$-C$_6$ alkyl sulfonic acid); styrene sulfonic acid; salts thereof; and mixtures thereof; and iii) a nonionic monomer selected from the group consisting of (alkyl)acrylamide; N-(alkyl)acrylamides; N,N-dialkyl acrylamides; methyl acrylate; methyl methacrylate; acrylonitrile; N-vinyl acetamide; N-vinylformamide; N-vinyl pyrrolidone; hydroxyalkyl methacrylates; styrene; vinyl acetate; salts thereof; and mixtures thereof.

2. A process according to claim 1, wherein the polymeric aggregating agent is selected from the group consisting of: cationic polyacrylamides, anionic polyacrylamides, nonionic polyacrylamides; and combinations thereof.

3. A process according to claim 2, wherein the polymeric aggregating agent is an anionic polyacrylamide emulsion.

4. A process according to claim 1, wherein the polymeric aggregating agent is present at from 40 to 3500 ppm based on the total volume of the solid-stabilized emulsion.

5. A process according to claim 4, wherein the polymeric aggregating agent is present at 1000 ppm.

6. A process according to claim 1, wherein the mixing step is performed from 1 to 10 minutes.

7. A process according to claim 6, wherein the mixing step is performed for 5 minutes.

8. A process according to claim 1, wherein the solid-stabilized emulsion is from a hydrometallurgical solvent extraction circuit for separating metal values selected from the group consisting of: copper; cadmium; chromium; cobalt; molybdenum; nickel; tin; uranium; vanadium; zinc; and combinations thereof.

9. A process according to claim 1 further comprising mixing a diluent with the solid-stabilized emulsion prior to performing step (a), wherein the diluent is selected from the group consisting of: organic solvent; carrier solvent; aromatic paraffins; aliphatic paraffins; naphthylenes; and combinations thereof.

10. A process according to claim 1, wherein the at least one hydrophilic solid is selected from the group consisting of: gravel, sand/silica, dirt, soil, mud, minerals, fragmented rock, clay, silt, ash, cement, zeolites, cellulosics, diatomaceous earth, pumice, and oxide minerals.

11. A process according to claim 10, wherein the at least one hydrophilic solid is a clay selected from the group consisting of: bentonite; montmorillonite; and kaolinite.

12. A process according to claim 11, wherein the clay is present at from 0.1% to 10% by weight of the total volume of the solid-stabilized emulsion.

13. A process according to claim 12, wherein the clay is present at from 0.5% to 5% by weight of the total volume of the solid-stabilized emulsion.

14. A process according to claim 1 further comprising a second separating step, wherein the remaining solid-stabilized emulsion from the first separating step is treated with mechanical means, thereby recovering any entrained organic.

15. A process according to claim 14, wherein said mechanical means includes one or more of a filter press, centrifuge, or 3-phase centrifuge.

16. A process according to claim 1 or claim 14 further comprising removing residual solids and/or surfactants from the recovered organic solvent extractant phase by:

treating the recovered organic solvent extractant phase with a hydrophilic solid; and removing the hydrophilic solid from the organic solvent extractant phase.

17. A process according to claim 16, wherein the hydrophilic solid of the treating step is a clay and is present at from 0.1% to 10% by weight of the total volume of the recovered organic solvent extractant phase.

18. A process according to claim 17, wherein the clay is present at from 0.5% to 5% by weight of the total volume of the recovered organic solvent extractant phase.

19. A process according to claim 1 further comprising returning the recovered organic solvent extractant phase to the hydrometallurgical extraction circuit.

20. A process for recovering an organic solvent extractant contained in a solid-stabilized emulsion formed in a hydrometallurgical solvent extraction circuit, the process comprising:

a) mixing a destabilizing amount of a polymeric aggregating agent as defined in claim 1 with the solid-stabilized emulsion, prior to, after, or simultaneously with adding a hydrophilic solid to the solid-stabilized emulsion, thereby separating the solid-stabilized emulsion into its aqueous, organic, and solid components;

b) further separating the solid components by mechanical means; and c) removing the organic solvent extractant from the separation steps of a) and b), thereby recovering the organic solvent extractant from the solid-stabilized emulsion.

21. A process according to claim 20, wherein the polymeric aggregating agent is present at 1000 ppm based on the total volume of the solid-stabilized emulsion.

22. A process according to claim 20 or claim 21, wherein the hydrophilic solid is selected from the group consisting of: gravel, sand/silica, dirt, soil, mud, minerals, fragmented rock, clay, silt, ash, cement, zeolites, cellulosics, diatomaceous earth, pumice, oxide minerals, and combinations thereof.

23. A process according to claim 22, wherein the hydrophilic solid is a clay selected from the group consisting of bentonite, montmorillonite, kaolinite, and combinations thereof, and wherein the clay is present at from 0.5 wt. % to 10 wt. % based on the total weight of the solid-stabilized emulsion.

24. A process according to claim 20, wherein prior to performing step (a) the solid stabilized emulsion is separated by mechanical means.

* * * * *